United States Patent [19]

Briere

[11] 4,381,327

[45] Apr. 26, 1983

[54] MICA-FOIL LAMINATIONS

[75] Inventor: Richard L. Briere, Hopkinton, Mass.

[73] Assignee: Dennison Manufacturing Company, Framingham, Mass.

[21] Appl. No.: 194,649

[22] Filed: Oct. 6, 1980

[51] Int. Cl.³ .......................... B32B 3/10; B44C 1/22

[52] U.S. Cl. .................................... 428/137; 156/329; 156/332; 156/630; 156/634; 156/656; 156/659.1; 427/208.4; 428/131; 428/138; 428/214; 428/215; 428/216; 428/335; 428/336; 428/209; 428/324; 428/363; 428/450; 428/447; 428/454; 428/522; 428/901; 430/312; 430/318

[58] Field of Search ............... 428/454, 324, 363, 901, 428/447, 209, 522, 450, 214, 215, 216, 336, 335, 138, 131, 137; 156/630, 634, 329, 332, 659.1, 656; 427/208.4; 430/318, 312

[56] References Cited

U.S. PATENT DOCUMENTS

| | | | |
|---|---|---|---|
| 3,026,222 | 3/1962 | Rogers | 428/324 |
| 3,092,250 | 6/1963 | Knutson | 428/344 |
| 3,618,753 | 11/1971 | Glasspoole | 428/363 |
| 3,867,245 | 2/1975 | Herman | 428/324 |
| 4,039,707 | 8/1977 | O'Malley | 428/447 |
| 4,155,093 | 5/1979 | Fotland | 361/229 |

*Primary Examiner*—Ellis P. Robinson
*Assistant Examiner*—1,12,22,23
*Attorney, Agent, or Firm*—Arthur B. Moore; George E. Kersey; Barry D. Josephs

[57] ABSTRACT

A method is disclosed for fabricating laminations of mica and conductive foils for generation of ions in air. A layer of mica is laminated to sheets of metallic foil using pressure sensitive adhesive as the bonding material. The foil is etched in order to form electrodes in a desired pattern. The mica-foil laminate may include an encapsulating layer or tape of pressure sensitive adhesive around the edges.

25 Claims, 3 Drawing Figures

MICA-FOIL LAMINATIONS

BACKGROUND OF THE INVENTION

The present invention relates to the fabrication of dielectric members using mica, and more particularly to the fabrication of laminations of mica and conductive materials.

Mica has long been known by those skilled in the art to be a suitable dielectric material for use in many different applications, including the construction of capacitors. Mica possesses superior dielectric properties, including a high dielectric constant and good dielectric strength. As a stable, inorganic material mica also has the advantage that it will resist eroding by a number of different substances. Mica may be easily fabricated in thin, uniform dielectric layers with thicknesses in the range of 0.25 to 1.0 mil. When fabricated in this thickness, mica is an extremely sturdy, durable material.

A particularly common application for mica is the use of mica as a dielectric component of capacitors. Mica capacitors are normally constructed by "silvering"—that is by printing electrodes onto blades of mica, usually by means of a silk screen process. The silver is applied to the mica in a solution, and the solvent evaporated by firing the combination in an oven. This fabrication method provides a good connection between mica and electrode, and allows a compact design by avoiding thick blades or foils. Because of the delicate nature of the electrodes created with this process, it is necessary to completely encapsulate the mica-electrode laminate to protect the electrodes from environmental influences.

In certain utilizations, however, it is necessary to directly expose the mica dielectric and electrode material to air. One such utilization is shown in U.S. Pat. No. 4,155,093, which discloses apparatus for generating ions in air. With reference to the prior art view of FIG. 1, the ion generator 10 comprises two conducting electrodes 12 and 13 separated by a layer 11 of mica. When a high frequency electrical field is supplied between these electrodes by source 14, a pool of negative and positive ions is generated in the areas of proximity of the apertured electrode 13 and the surface of the mica. Thus, in FIG. 1, an air gap breakdown occurs relative to a region 11-*r* of dielectric 11, creating an ion pool in hole 13-*h* which is formed in electrode 13.

These ions may be used, for example, to create an electrostatic latent image on a dielectric member 15 with a conducting layer 16. When a switch 18 is switched to position X and grounded as shown, the electrode 16 is also at ground potential and little or no electric field is present in the region between the ion generator 10 and the dielectric member 15. However, when switch 18 is switched to position Y, at which the potential of the source 17 is applied to the electrode 13, this provides an electric field between the ion reservoir 11-*r* and the back of dielectric member 15. Ions of a given polarity (in the generator of FIG. 1, negative ions) are extracted from the air gap breakdown region and charge the surface of the dielectric member 15. The rate of charging the dielectric surface may be expressed as a given ion current.

The ion generator shown in FIG. 1 requires exposure of the mica 11 and the apertured electrode 13 to air. As such, it has been found that fabricating mica laminates by silvering results in laminations which are unable to withstand the incursion of materials, such as ozone and nitric acids, which are produced as normal byproducts of the ion generation process. On the other hand, traditional methods of laminating thicker layers of conducting foils, such as bonding the layers with thermoset adhesives, present the problem that mica is easily delaminated, particularly when subjected to the action of liquids.

Although known encapsulation techniques for mica capacitors protect against delamination due to moisture, these techniques are unsuitable for applications which require exposure to air of the conductive material as well as the dielectric. The construction of an externally exposed mica-foil laminate by traditional methods will result in a structure which will tend to deteriorate easily and have only a very short service life. A laminate of the type illustrated in FIG. 1 must withstand high peak voltage RF signals, on the order of kilovolts.

Accordingly, it is a principal object of the invention to provide a method of fabricating durable mica-conductor laminates. A related object is that the laminates of the invention resist delamination due to moisture, and erosion due to ozone, nitric acid, and other substances.

Another object of the invention is the achievement of a mica-conductor laminate which exposes the various layers to air. A related object is the design of a laminate which is suitable for generating ions in air.

Yet another object of the invention is the fabrication of a mica-conductor laminate which is physically stable over a wide range of temperatures. A related object is the achievement of an ion generator which can carry high peak voltage RF signals over a long service life.

SUMMARY OF THE INVENTION

In furthering the above and related objects the invention provides a method for fabricating laminations of mica and conductive materials. The laminations of the invention include a sheet of mica, one or more metallic sheets, and bonding layers of pressure sensitive adhesive. In the preferred embodiment of the invention, this method is used to produce apparatus for generating ions in air.

In accordance with one aspect of the invention, sheets of mica and conductive material such as foil are bonded together by thin layers of pressure sensitive adhesive. In accordance with a preferred embodiment of the invention, the pressure sensitive adhesive may be a silicon-based or acrylic-based adhesive.

In accordance with another aspect of the invention, portions of the conductive layer or layers may be selectively removed by etching to create a desired pattern. In accordance with a related aspect of the invention, this method may be used to create electrodes of a given configuration. In accordance with a further related aspect of the invention, the conductive layer may be comprised of stainless steel, copper, nickel, and other metals which may be etched.

In accordance with a further aspect of the invention, the edges of the mica and conductive layers may be coated with pressure sensitive adhesive for protective purposes. In accordance with a related aspect, the lamination may be dipped in pressure sensitive adhesive to avoid exposing the edges to environmental influences. In a particular embodiment, the edges of the lamination are covered with a protective tape including a coating of pressure sensitive adhesive. The tape may be applied permanently as a seal against moisture, or temporarily, to provide protection during processing of the lamination.

In accordance with yet another aspect of the invention, the mica layer or layers may be fabricated in a thickness range from 2μ-75μ, most preferably 10μ-15μ. In accordance with a related aspect of the invention, such layer or layers is bonded to a conductive layer or layers having a thickness in the range from 6μ-50μ, preferably around 25μ. Bonding is effected by layers of pressure sensitive adhesive having a thickness in the range from 0.5μ-5μ.

In accordance with a preferred embodiment of the invention, a mica-foil lamination is fabricated to create apparatus for generating ions in air. A layer of mica having a thickness around 15μ is bonded on each face to a 25μ thick thick stainless steel foil, this bonding being accomplished by a layer of pressure sensitive adhesive approximately 2μ in thickness. The lamination is covered with pressure sensitive adhesive tape around the edges. In accordance with a further aspect of the embodiment, the foil layers are photoetched with a matrix electrode pattern. In the preferred version of the embodiment, the lamination is bolted on one face to a mounting block which acts as a heat sink.

BRIEF DESCRIPTION OF THE DRAWINGS

The above and additional objects of the invention are illustrated in the detailed description which follows, taken in conjunction with the drawings in which.

DETAILED DESCRIPTION

Figure 1:
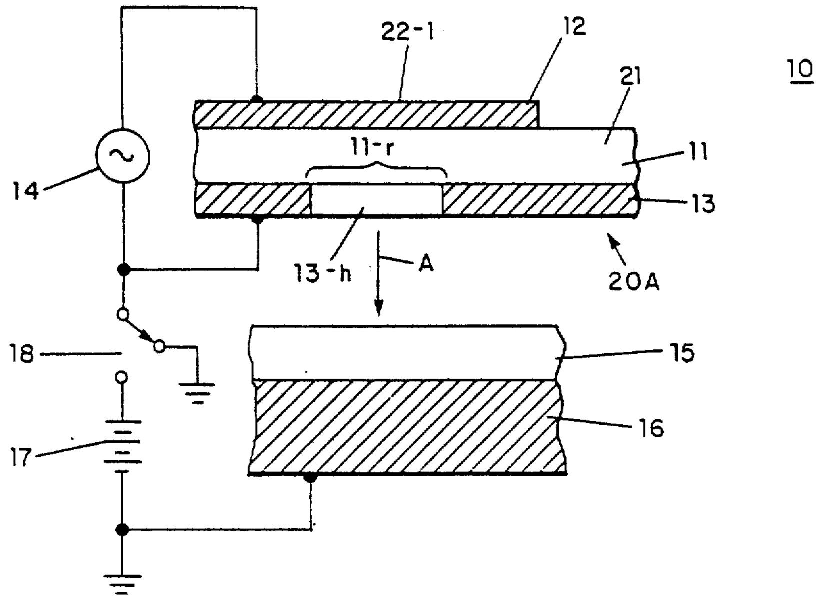
FIG. 1 PRIOR ART
FIG. 1 is a sectional view of a prior art ion generator, disclosed in U.S. Pat. No. 4,155,093.
Figure 2:
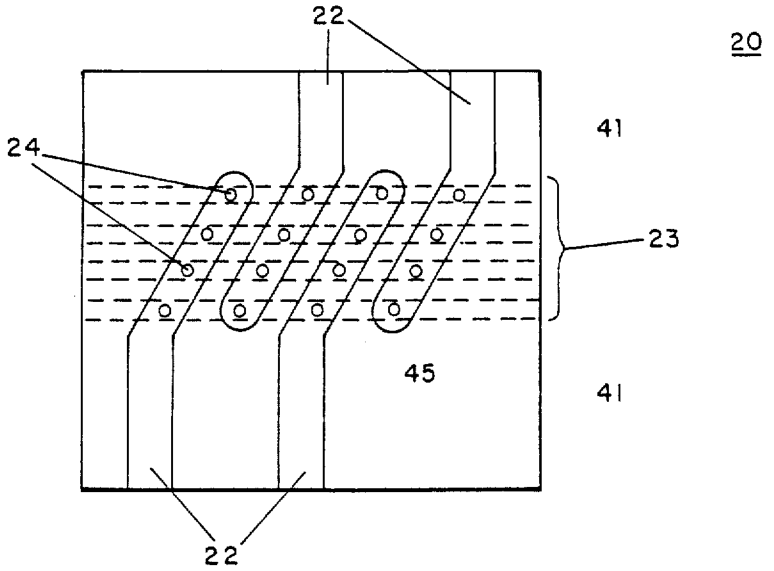
FIG. 2 PRIOR ART
FIG. 2 is a prior art view of a multiplexed ion generator of the type shown in FIG. 1.
Figure 3:
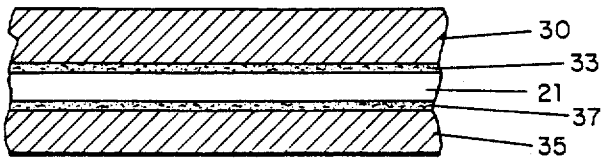
FIG. 3 is a sectional view of a mica-foil lamination in accordance with a preferred embodiment of the invention.

Reference should now be had to FIGS. 1-3 for a detailed description of the mica-conductor laminate of the invention. With reference to the prior art view of FIG. 1, an ion generator in accordance with U.S. Pat. No. 4,155,093 may be fabricated using a layer of mica laminated to thin sheets of metallic foil, by etching the foil to create an array of electrodes on each side of the mica. One such electrode pattern is illustrated in the plan view of FIG. 2, showing a series of finger electrodes 22 on one side of a mica sheet 21, and a transverse series of selector bars 23 on the other side of the mica sheet. The finger electrodes 22 correspond to electrode 13 in FIG. 1, and selector bars 23 correspond to electrode 12. An array of apertures 24 are located in the finger electrodes 22 at the crossover points with selector bars 23.

Electrodes 22 and 23 are formed by laminating a thin sheet of conductive foil to each face of the mica sheet 21. With reference to the sectional view of FIG. 3, a mica sheet 21 of uniform thickness is bonded to two layers of foil 30 and 35. The bonding is achieved using thin layers of pressure sensitive adhesive 33 and 37.

The preferred dielectric material is Muscovite mica, $H_2KAl_3(SiO_4)_3$. It is desirable to have a sheet of uniform thickness in the range from about 2μ-75μ, most preferably 10μ-15μ. The thinner mica sheets are generally harder to handle and more expensive, while the thicker mica requires higher RF voltages between electrodes 12 and 13 (see FIG. 1). The mica should be free of cracks, fractures, and similar defects.

The foil layers 30 and 35 advantageously comprise a metal which may be easily etched in a pattern of electrodes 22, 23. Illustrative materials include nickel, copper, tantalum, and titanium; the preferred material, however, is stainless steel. A foil having a thickness from about 6μ-50μ is desirable, with the preferred thickness being around 25μ.

A wide variety of pressure sensitive adhesives are suitable for layers 33 and 37 (FIG. 3). A number of characteristics should be considered in choosing an appropriate pressure sensitive adhesive. The adhesive should be thermoplastic, and be resistant to moisture and chemicals. It should be able to withstand the high temperatures resulting from high voltage alternating potentials, on the order of kilovolts. The adhesive should be suitable for bonding of metal to mica. Illustrative adhesive formulations which satisfy the above criteria include solutions of organopolysiloxane resins, as well as acrylic based pressure sensitive adhesives.

The mica is coated with a pressure sensitive adhesive formulation using any well known technique which permits precise control over the coating thickness. The adhesive layers desirably have a thickness in the range of 0.5μ-5μ, most preferably in the range 0.6μ-2.5μ. The thickness may be determined after lamination by subtracting the known thickness of the mica and foil sheets from the total thickness of the laminate. The adhesive may be applied manually, as by brush coating, spraying, and dipping. The preferred method of coating is that of dipping the mica into a bath of pressure sensitive adhesive, followed by withdrawal of the mica at a calibrated speed. Generally, a faster speed of withdrawal results in a thicker pressure sensitive adhesive coating on each side of the mica sheet 21.

In the preferred embodiment of the invention, the pressure sensitive adhesive is applied to the mica in solution. The resin may be diluted to a desired viscosity using a variety of solvents, well known to those skilled in the art. In general, higher viscosity formulations will result in a thicker layer of pressure sensitive adhesive for a given method of application. Advantageously, the pressure sensitive adhesive formulation has a viscosity in the range from about 10 cps.-100 cps. The mixture advantageously is filtered prior to coating onto the mica sheet 21.

The coating of mica sheet 21 preferably involves dipping the sheet into the pressure sensitive adhesive bath to completely cover both sides; it is not necessary, however, to coat the edges of the mica sheet in the preferred embodiment, which calls for a separate protective medium for the edges of the lamination. In lieu of or in addition to a protective coating around the edges of the mica sheet 21, a protective layer of tape may be applied to the edges of the mica-foil lamination. The tape provides protection against migration of moisture between layers of the mica. Alternatively, the tape may be removed after processing of the mica, during which it provides a protective layer, as further discussed herein. Preferably, the tape is coated on one face with pressure sensitive adhesive which may be the same type as used to bond the mica-foil layers.

In the case of certain pressure sensitive adhesives, the adhesive coating is cured in order to cross-link the formulation and thereby enhance its adhesive character. This may be done using any suitable technique for the given adhesive formulation, such as heat or radiation curing.

The foil sheets 30 and 35 are cut to desired dimensions, and cleaned prior to application to the mica sheet 21. Each sheet is placed in registration with one face of the mica sheet, and then bonded to the mica by applying pressure evenly over the foil layers.

After lamination of the foil layers 30 and 35 to mica sheet 21, the foil is selectively removed to create a desired pattern, as for example the pattern of electrodes 22 and 23 shown in FIG. 2. In the preferred embodiment, the desired pattern is created by a photoetching process. This involves coating the foil with a photoresistant material; covering the coated foil with a photomask to create the desired patterns; exposing the masked laminate to ultraviolet radiation; and etching the irradiated foil in order to remove those portions which have been rendered soluble during the preceding steps. The preferred version of this process uses a positive photoresist, which is characterized in that those areas which are exposed to ultraviolet radiation will be rendered soluble and later dissolved.

In the case of solvent based photoresist, there is a tendency of the solvent to leach out the pressure sensitive adhesive around the edges of the lamination. In addition, the photoresist will not coat well due to edge effects, creating a danger of etch-through. For these reasons, it is advisable to tape the edges to provide a protective layer during these processing steps; the tape may be removed after etching. Alternatively, one may employ a dry film photoresist, which will adequately protect the edges of the lamination if applied in a thickness of around 35μ.

In accordance with a particular embodiment, a heat sink may be appended to the mica-foil laminate. The heat sink is applied to the lamination face containing selector bars 23 in order to absorb heat resulting from high voltage alternating potentials. A variety of materials are suitable as well known in the art; in the case of electrically conductive materials, an insulating layer must be included to isolate the heat sink from selector bars 23.

In the examples which follow, all proportions given are by weight unless otherwise noted.

EXAMPLE I

| | |
|---|---|
| 220 parts | Methylphenyl polysiloxane resin solution |
| 1 part | 2,4 Dichlorobenzoyl peroxide |
| 1 part | Dibutyl phthalate |

A pressure-sensitive adhesive composition as set forth above was formulated, then diluted to 90 cps. with butyl acetate. The resulting liquid was filtered under a pressure of approximately 30 PSI, and poured into a graduate.

The following steps were carried out in a dust-free environment. A sheet of mica having a thickness in the range 20–25 microns was cleaned using lint-free tissues and methyl ethyl ketone (MEK). After drying, the mica sheet was suspended from a dipping fixture and lowered into the pressure-sensitive adhesive formulation until all but two millimeters was submersed. The mica was then withdrawn from the adhesive bath at a speed of 2 cm/minute, providing a layer of adhesive approximately 3 microns in thickness. The coated mica was stored in a dust-free jar and placed in a 150° C. oven for five minutes in order to cure the pressure-sensitive adhesive.

Two sheets of stainless steel 25 microns thick were cut to the desired dimensions and cleaned using MEK and lint-free tissues. One of the sheets was placed in a registration fixture, followed by the coated mica and the second foil sheet. Bonding was effected by application of light finger pressure from the middle out to the edges, followed by moderate pressure using a rubber roller. Any adhesive remaining on exposed mica surfaces was removed using MEK and lint-free tissues. The edges of the lamination were then covered with a 0.6 mm wide Kapton Tape coated with the above pressure sensitive adhesive formulation.

The foil layers were respectively etched in the patterns of electrodes 22 and 23 (FIG. 2) using a positive photoresist.

EXAMPLE II

An ion generator was fabricated in accordance with Example I, modified as follows: The pressure-sensitive adhesive was formulated from a copolymer of 80 percent butyl acrylate–20 percent acrylic acid. The adhesive was diluted to 50 cps. using butyl acetate.

EXAMPLE III

An ion generator was fabricated in accordance with Example I, and placed in a mounting fixture with the selector bars 23 upward. A capacitor glass mounting block of dimensions compatible with the mica was prepared for mounting by application of a layer of silicone adhesive resin in accordance with the table of Example I, followed by smoothing of the adhesive using a metering blade. The mounting block was clamped in registration with the laminate, and any excess adhesive at the edges was removed using cotton swabs. The completed structure was set aside for 24 hours to allow the adhesive to set.

While various aspects of the invention have been set forth by the drawings and the specification, it is to be understood that the foregoing detailed description is for illustration only and that various changes in parts, as well as the substitution of equivalent constituents for those shown and described, may be made without departing from the spirit and scope of the invention as set forth in the appended claims.

I claim:

1. A method of fabricating a dielectric-electrode laminate comprising the steps of:
   (a) applying a layer of pressure sensitive adhesive to a sheet of mica, said pressure sensitive adhesive comprising a thermoplastic material selected from the class consisting of organopolysiloxane pressure sensitive adhesives,
   (b) bonding a face of a metallic sheet to a face of said mica sheet with said thermoplastic pressure sensitive adhesive, and
   (c) selectively removing portions of said metallic sheet to create an electrode pattern, wherein the dielectric-electrode laminate resists delamination due to moisture, and erosion due to ozone and nitric acid.

2. A method as defined in claim 1 in which the thermoplastic pressure sensitive adhesive comprises a methyl phenyl polysiloxane adhesive.

3. A method as defined in claim 1, in which step (b) comprises bonding a metallic sheet to each face of the mica sheet, and step (c) comprises selectively removing portions of each metallic sheet to create first and second electrode patterns on opposite faces of the mica sheet.

4. The method of claim 1, in which step (a) comprises immersing said mica sheet in a bath of thermoplastic pressure sensitive adhesive, and withdrawing the mica sheet from the adhesive bath at a controlled speed to form a thermoplastic pressure sensitive adhesive layer of desired thickness.

5. A method as defined in claim 1 in which step (c) comprises the steps of:

applying a layer of photoresist to said metallic sheet, placing a photomask patterned in accordance with said electrode pattern over the photoresist, and exposing the resulting structure to ultraviolet radiation.

6. A method as defined in claim 1, in which said metallic sheet comprises a sheet of stainless steel foil.

7. A method as defined in claim 1 in which step (a) comprises coating the entire mica sheet, including the edges, with a layer of thermoplastic pressure sensitive adhesive.

8. A method as defined in claim 1 further comprising the step of applying a protective tape to the edges of said mica sheet.

9. A method as defined in claim 1 further comprising the step of bonding a heat sink to the laminate subsequent to step (c).

10. A method as defined in claim 1 in which step (a) comprises applying to the mica sheet a layer of liquid thermoplastic pressure sensitive adhesive having a viscosity in the range 10 centipoise-100 centipoise.

11. A dielectric-electrode laminate produced by the method of claim 1.

12. A dielectric-electrode laminate comprising:

a mica sheet;

at least one electrode bonded to a face of said mica sheet, said electrode being comprised of a metallic sheet, the bond between said electrode and said mica sheet being accomplished by a layer of thermoplastic pressure sensitive adhesive comprising an organopolysiloxane pressure sensitive adhesive, wherein the dielectric-electrode laminate resists delamination due to moisture, and erosion due to ozone and nitric acid.

13. A dielectric-electrode laminate as defined in claim 12 wherein said thermoplastic pressure sensitive adhesive comprises a methyl phenyl polysiloxane adhesive.

14. A laminate as defined in claim 12, in which the metallic sheet comprises a foil of a material selected from the classes consisting of stainless steel, copper, nickel, titanium, and tantalum.

15. A laminate as defined in claim 12 in which said metallic sheet has a thickness in the range from 6 microns-50 microns.

16. A laminate as defined in claim 15 in which said metallic sheet has a thickness around 25 microns.

17. A laminate as defined in claim 12 in which said thermoplastic pressure sensitive adhesive layer has a thickness in the range 0.5 microns-5 microns.

18. A laminate as defined in claim 17 in which said thermoplastic pressure sensitive adhesive layer has a thickness in the range 0.6 microns-2.5 microns.

19. A laminate as defined in claim 12 in which said mica sheet has a thickness in the range from 2-75 microns.

20. A laminate as defined in claim 19 in which said mica sheet has a thickness in the range 10-15 microns.

21. A laminate as defined in claim 12 in which said mica sheet has a thickness in the range from 10-15 microns, said metallic sheet has a thickness in the range from 6-50 microns, and said layer of pressure sensitive adhesive has a thickness in the range from 0.5-5 microns.

22. A laminate as defined in claim 12 in which electrodes are bonded to both faces of said mica sheet.

23. A laminate as defined in claim 22 wherein the first electrode comprises a series of selector bars, and the second electrode comprises a series of finger electrodes aligned transversely to said selector bars, said finger electrodes having apertures at crossover locations with respect to said selector bars.

24. A dielectric-electrode laminate comprising:

a mica sheet having a thickness in the range from 2-75 microns;

at least one electrode bonded to a face of said mica sheet, said electrode being comprised of a metallic sheet, the bond between said electrode and said mica sheet being accomplished by a layer of pressure sensitive adhesive selected from the class consisting of solutions of organopolysiloxane resins and acrylic-based pressure sensitive adhesives, said adhesive layer having a thickness in the range from 0.5 microns-5 microns, wherein the dielectric-electrode laminate resists delamination due to moisture, and erosion due to ozone and nitric acid.

25. A dielectric-electrode laminate as defined in claim 24 wherein said pressure sensitive adhesive comprises a methyl phenyl polysiloxane pressure sensitive adhesive.

* * * * *